United States Patent
Lee

(10) Patent No.: US 6,833,644 B1
(45) Date of Patent: Dec. 21, 2004

(54) EXTERNAL ROTOR BRUSH DC MOTOR FOR A TREADMILL

(75) Inventor: Ying-Che Lee, Taipei (TW)

(73) Assignee: Chi Hua Fitness Co., Ltd., Taipei Hsien (TW)

( * ) Notice: Subject to any disclaimer, the term of this patent is extended or adjusted under 35 U.S.C. 154(b) by 0 days.

(21) Appl. No.: 10/799,667

(22) Filed: Mar. 15, 2004

(51) Int. Cl.[7] .............................................. H02N 1/04
(52) U.S. Cl. ........................................ 310/98; 310/91
(58) Field of Search ............................ 310/71, 89, 91, 310/98, 233, 216, 254

(56) References Cited

U.S. PATENT DOCUMENTS 3,711,812 A * 1/1973 Cherry ........................ 338/200
4,635,927 A * 1/1987 Shu ............................... 482/7
4,664,646 A * 5/1987 Rorabaugh .................. 474/88
5,141,479 A * 8/1992 Vanjani et al. .............. 482/54
6,455,960 B1 * 9/2002 Trago et al. ................ 310/64

* cited by examiner

Primary Examiner—Thanh Lam
(74) Attorney, Agent, or Firm—Rosenberg, Klein & Lee

(57) ABSTRACT

An external rotor brush motor includes a permanent magnet mounted on a fixed shaft to form an internal stator, a front wheel and a rear wheel mounted on the shaft at two sides, the front wheel having an integrated belt pulley for the mounting of a transmission belt, a commutator provided at the rear wheel for synchronous rotation, a shell connected between the front wheel and the rear wheel for synchronous rotation; an iron core and a coil mounted inside the shell and forming an external rotor, a cover affixed to the shaft and covered over the commutator; and two electric brushes fixedly mounted inside the cover and respectively pressed on the commutator.

4 Claims, 6 Drawing Sheets

EXTERNAL ROTOR BRUSH DC MOTOR FOR A TREADMILL

BACKGROUND OF THE INVENTION

1. Field of the Invention

The present invention relates generally to a motor for use in a treadmill and more particularly, to an external rotor brush motor, which has the motor shell functions as the rotor as well as the inertia flywheel and, which uses a brush DC design to eliminate the arrangement of a direction change and control circuit that is requisite in a brushless motor.

2. Description of the Related Art

FIGS. 6 and 7 show an internal rotor DC motor 20 used in a treadmill 10 according to the prior art. According to this design a heavy inertia flywheel 23 is installed in the output shaft 22, which is coupled to the internal rotor 21, and a drive wheel 24 is mounted on the output shaft 22 and coupled to a driven wheel 13 through a transmission belt 25 for driving the driven wheel 13 to rotate the roller 12 and the treadmill belt 11 on which the user treads. Because the heavy inertial flywheel 23 is necessary, labor and material cost is relatively increased. Further, dynamic balance of the heavy inertial flywheel 13 and the motor 20 are separately handled, complicating precision control.

U.S. Pat. No. 6,661,136 (equivalent to Taiwan publication no. 535603), issued to the present inventor, discloses an external rotor DC motor, which saves much labor and material cost. This structure of external rotor DC motor is functional, however its low heat dissipation efficiency may affect high performance of the motor. Further, because the controller of this design of external rotor DC motor is expensive, this structure of brushless external rotor DC motor is not practical for use in a treadmill of relatively low price.

Therefore, it is desirable to provide an external rotor brush DC motor that eliminates the aforesaid drawbacks.

SUMMARY OF THE INVENTION

The present invention has been accomplished under the circumstances in view. It is the main object of the present invention to provide an external rotor brush DC motor, which dissipates heat quickly during operation, thereby achieving high performance. It is another object of the present invention to provide an external rotor brush DC motor, which is durable in use. It is still another object of the present invention to provide an external rotor brush DC motor, which has the rotor working as an inertia flywheel, thereby saving much material and processing cost and achieving high precision in dynamic balance.

To achieve these and other objects of the present invention, the external rotor brush DC motor comprises a shaft fixedly mounted on a bracket; a permanent magnet mounted on a middle part of the shaft and forming with the shaft a stator; a front wheel and a rear wheel mounted on the shaft with a respective axle bearing and spaded from the permanent magnet at front and rear sides, the front wheel having a belt pulley formed integral with the periphery thereof, the rear wheel having a through hole; a commutator provided at an outer side of the rear wheel for synchronous rotation with the rear wheel; a shell connected between the front wheel and the rear wheel for synchronous rotation; an iron core and a coil mounted in an inside wall of the shell and forming with the shell and the front wheel and the rear wheel a rotor, the coil having a lead wire inserted through the through hole of the rear wheel and electrically connected to the commutator; a cover affixed to the shaft and covered over the commutator; and a left-side electric brush and a right-side electric brush fixedly mounted inside the cover and respectively pressed on the commutator.

DETAILED DESCRIPTION OF THE INVENTION

Figure 1:
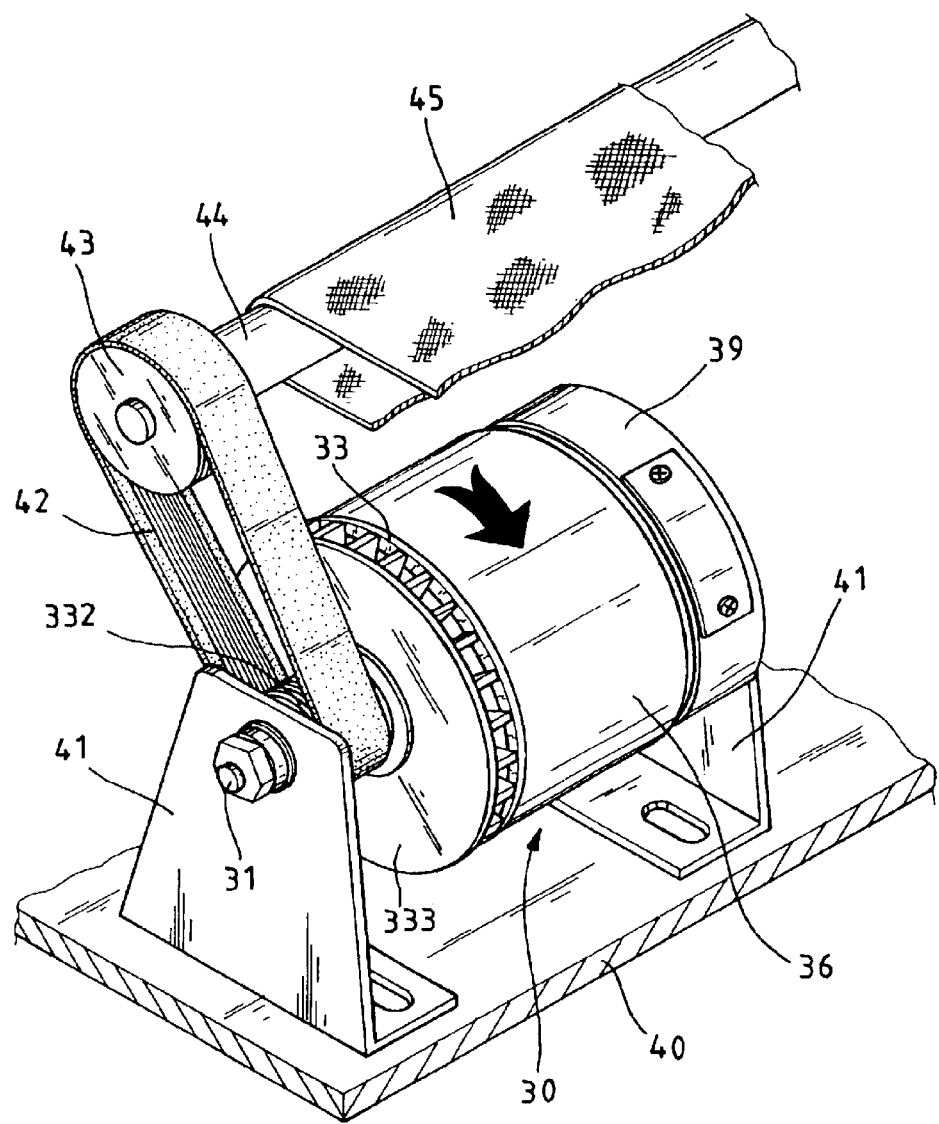
FIG. 1 is a perspective view showing an external rotor brush DC motor installed in a treadmill according to the present invention.

Referring to FIG. 1, an external rotor brush DC motor 30 is mounted on a bracket 41 at a treadmill 40, and adapted to rotate a belt pulley 43 through a transmission belt 42 and to further rotate a roller 44 and a treadmill belt 45 on the roller 44.

Figure 2:
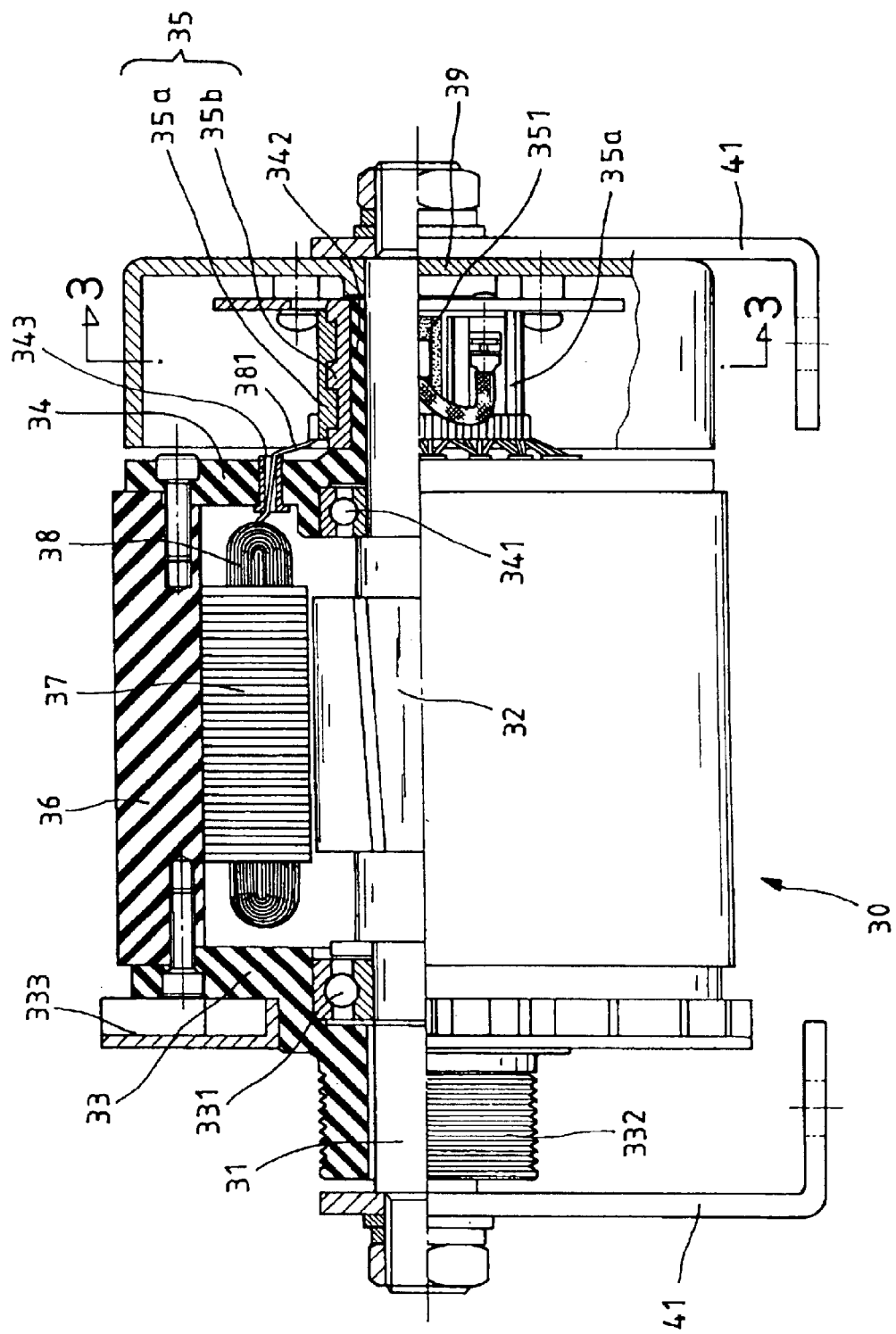
FIG. 2 is a sectional view of the external rotor brush DC motor according to the present invention.
Figure 3:
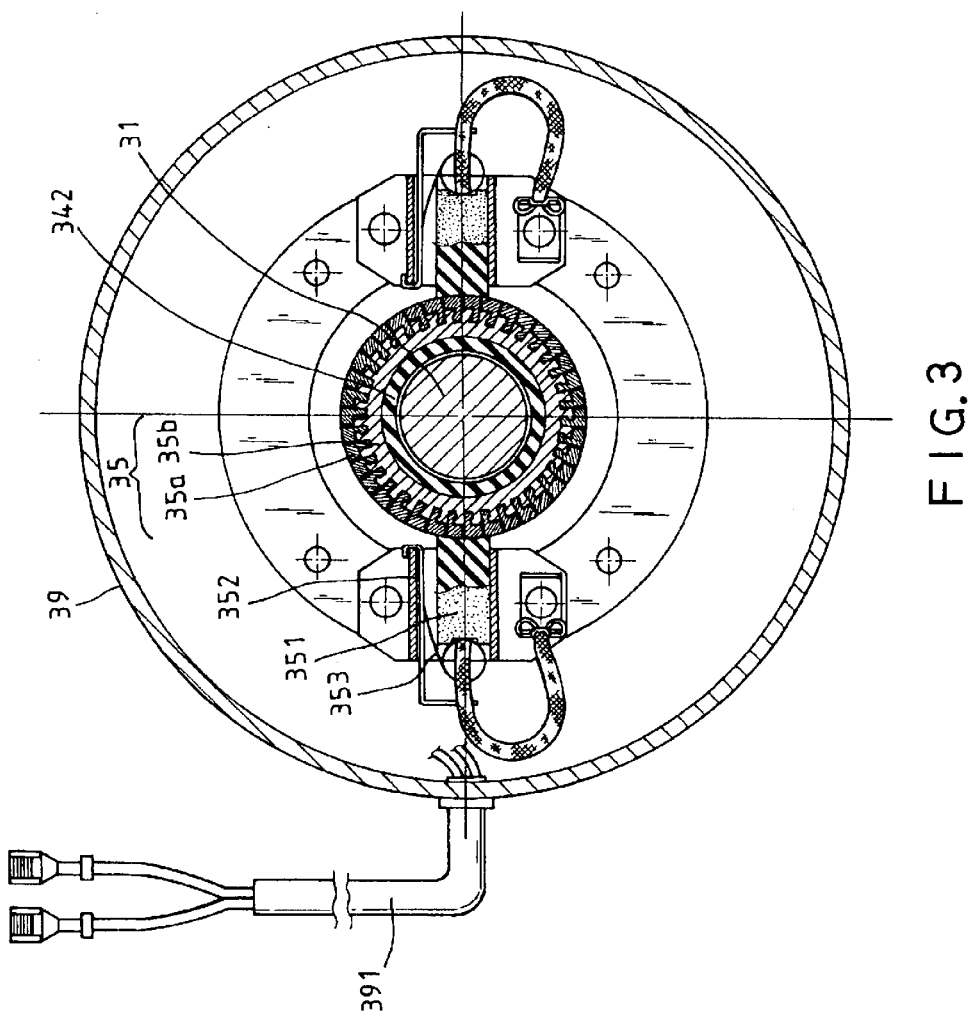
FIG. 3 is a sectional view taken along line 3—3 of FIG. 2, showing the structure of the commutator and the electric brushes.

Referring to FIGS. 2 and 3, the motor 30 comprises a shaft 31 supported on the bracket 41, a permanent magnet 32 mounted on the shaft 31 on the middle, two axle bearings 331, 341 mounted on shaft 31 and respectively disposed at the front and rear sides of the permanent magnet 32, a front wheel 33 and a rear wheel 34 respectively mounted on the axle bearings 331, 341, a belt pulley 332 formed integral with the periphery of the front wheel 33 and coupled to the aforesaid belt pulley 43 through the aforesaid transmission belt 42, a commutator 35 formed of commutator elements 35a and inner insulative elements 35b and fixedly mounted on the peripheral flange 342 of the rear wheel 34, a shell 36 provided between the front wheel 33 and the rear wheel 34, an iron core 37 and a coil 38 mounted on the inside wall of the shell 36, and a cover 39 mounted on the shaft 31 and covered over the commutator 35 at an outer side. The coil 38 has a lead wire 381 inserted through a through hole 343 in the rear wheel 34 and connected to the commutator 35. The commutator 35 comprises two electric brushes 351 installed in the cover 39, and a power cord 391 connected to external power supply and adapted to provide the necessary working voltage to the electric brushes 351. A respective brush holder 351 and a respective spiral spring 353 are used to hold each electric brush 351 in place. The installation of the electric brushes 351 are of the known art, no further detailed description in this regard is necessary.

Figure 5:
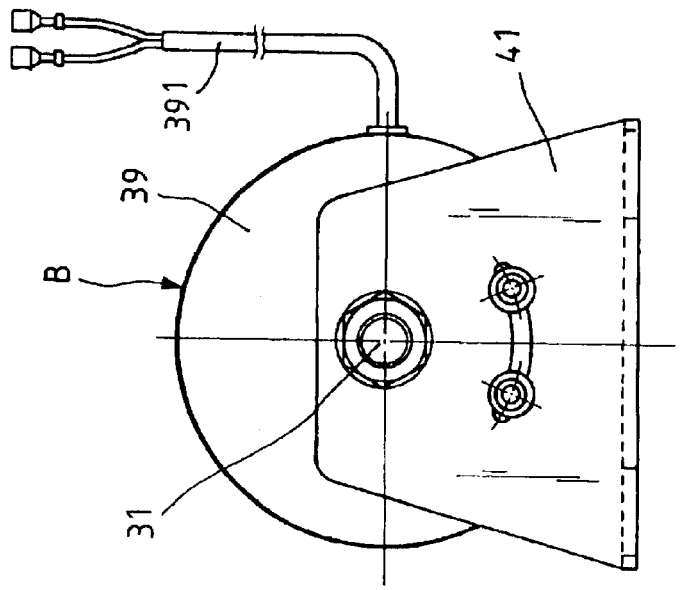
FIG. 5 is a side view of the external rotor brush DC motor according to the present invention.
Figure 4:
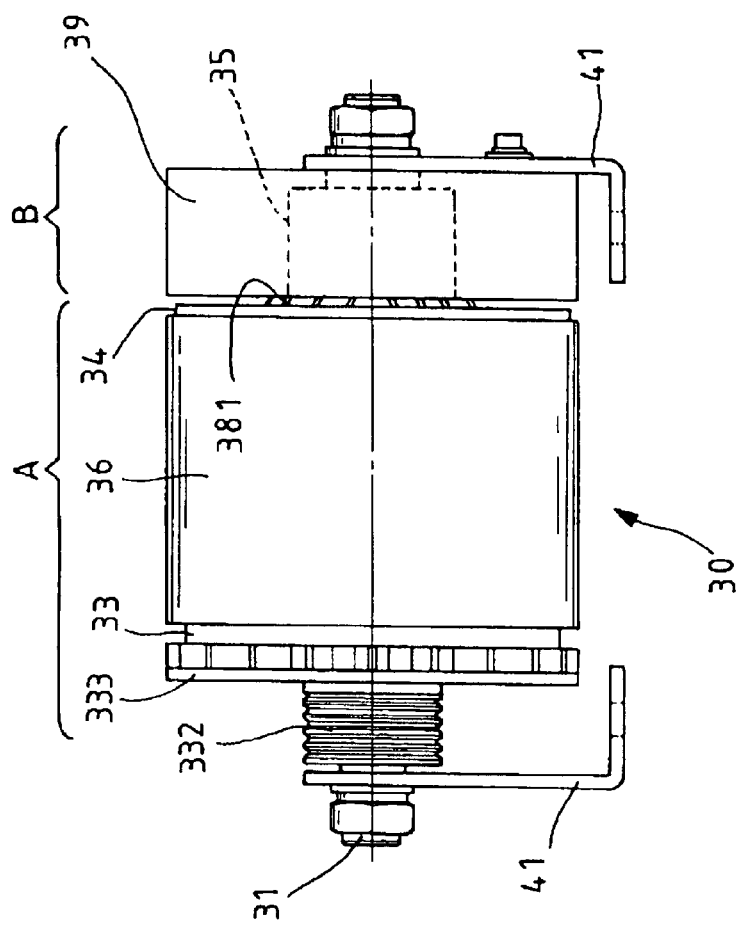
FIG. 4 is a front view of the external rotor brush DC motor according to the present invention.
Figure 6:
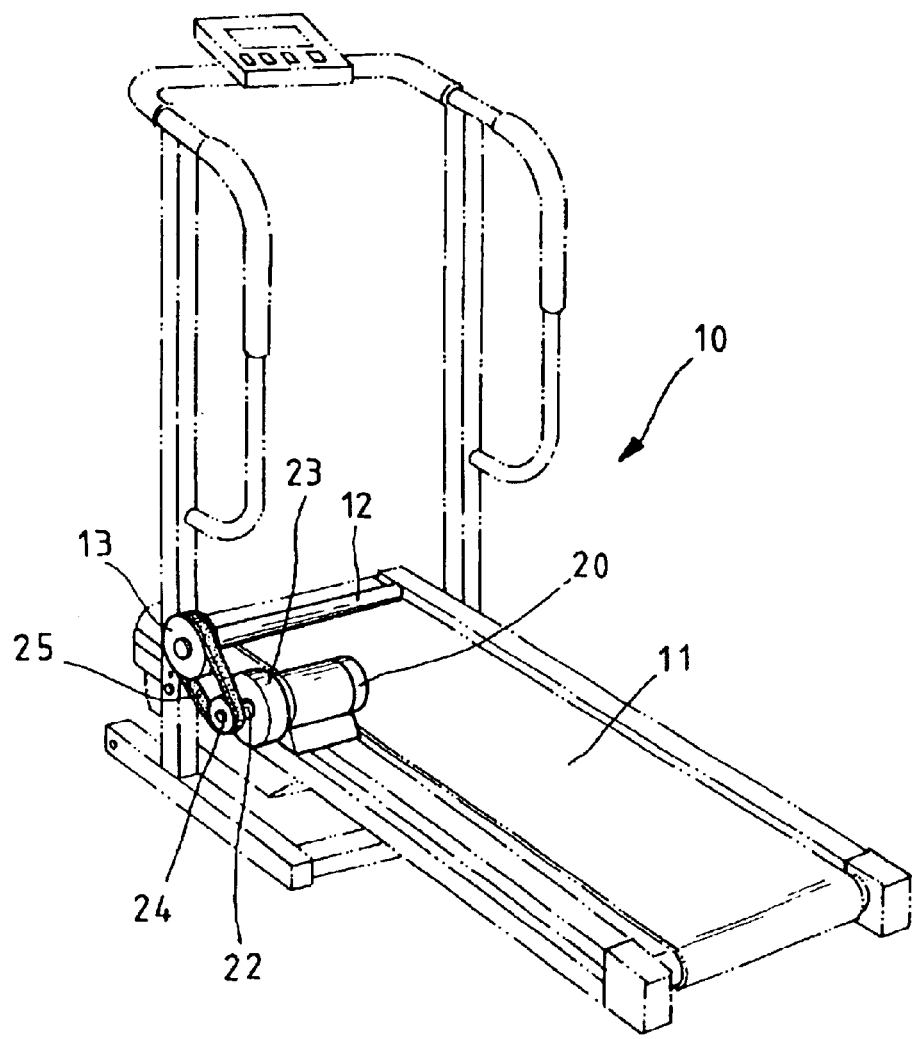
FIG. 6 is a schematic drawing showing an internal rotor brush DC motor installed in a treadmill according to the prior art.
Figure 7:
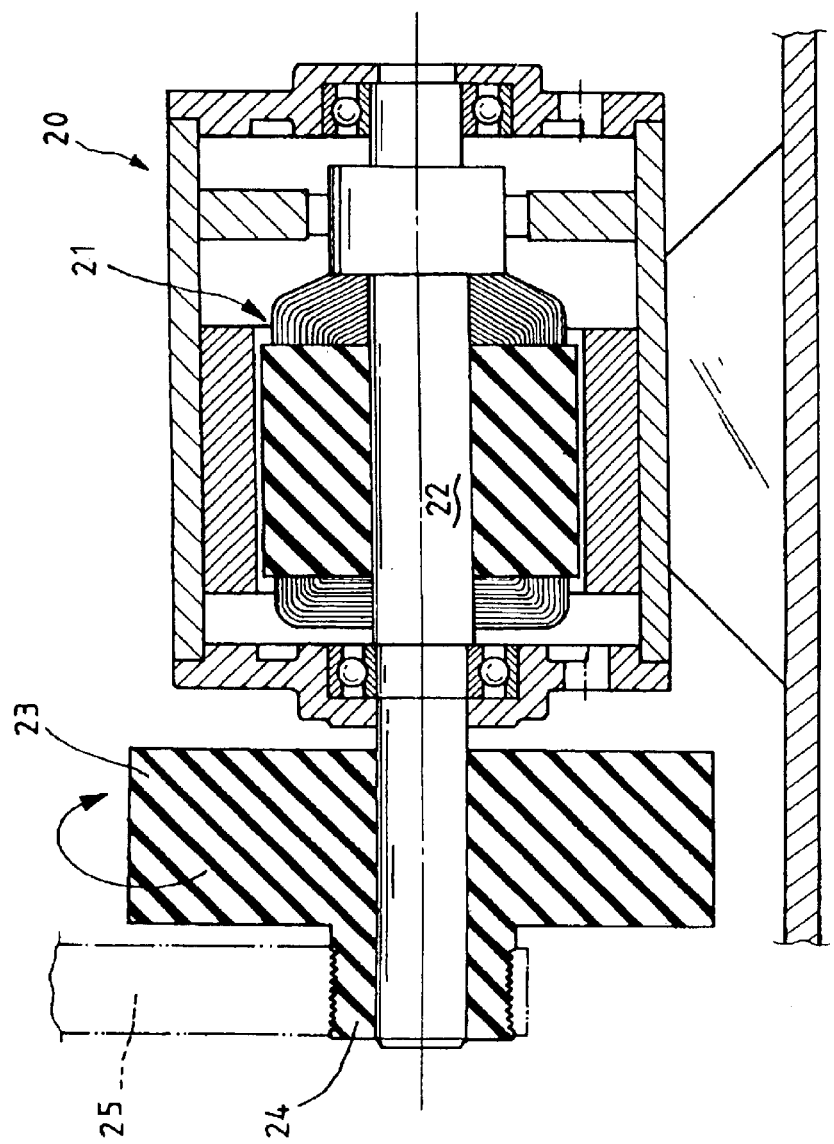
FIG. 7 is a sectional view of the internal rotor brush DC motor according to the prior art.

When in use, AC power supply is delivered to the electric brushes 351 through the power cord 391, and the commutator 35 reverses the direction of the current and provides DC to the coil 38 via the lead wire 381, thereby causing a magnetic force to be produced between the iron core 37 and the permanent magnet 32 to bias the shell 36. During rotary motion of the shell 36, the front and rear wheels 33, 34 and the commutator 35 are synchronously rotated, forming a rotor A, as shown in FIG. 4. At this time, the bracket 41, the shaft 31, the cover 39 and the brushes 351 are immovable, thereby forming a stator B. Therefore, as shown in FIG. 5, the power cord 391 is free from the influence of the rotary motion of the rotor A, and keeps supplying DC power supply to the electric brushes 361. During rotary motion, the rotor A simultaneously works as an inertia flywheel, therefore no additional inertia wheel is necessary.

As indicated above, the external rotor brush DC motor is easy to install for practical use in a treadmill. The simple control circuit design greatly reduces the manufacturing cost of the external rotor brush DC motor.

Further, because the brush DC motor is an external rotor type with the coil 38 installed in the inside of the shell 36 of the external rotor, heat is quickly dissipated into outside air during rotary motion of the coil 38 with the shell 36. Because of high heat dissipation efficiency, the working efficiency of the motor is relatively improved. Further, a fan blade 33 may be provided at the front wheel 33 to improve heat dissipation efficiency.

A prototype of external rotor brush DC motor has been constructed with the features of FIGS. 1~5. The external rotor brush DC motor functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An external rotor brush DC motor comprising:

a shaft fixedly mounted on a bracket;

a permanent magnet mounted on a middle part of said shaft and forming with said shaft a stator;

a front wheel and a rear wheel mounted on said shaft with a respective axle bearing and spaded from said permanent magnet at front and rear sides, said front wheel having a belt pulley formed integral with the periphery thereof, said rear wheel having a through hole;

a commutator provided at an outer side of said rear wheel for synchronous rotation with said rear wheel;

a shell connected between said front wheel and said rear wheel for synchronous rotation;

an iron core and a coil mounted in an inside wall of said shell and forming with said shell and said front wheel and said rear wheel a rotor, said coil having a lead wire inserted through the through hole of said rear wheel and electrically connected to said commutator;

a cover affixed to said shaft and covered over said commutator; and a left-side electric brush and a right-side electric brush fixedly mounted inside said cover and respectively pressed on said commutator.

2. The external rotor brush DC motor as claimed in claim 1, wherein said left-side electric brush and said right-side electric brush are respectively fastened to said cover with a respective brush holder and a respective spiral spring.

3. The external rotor brush DC motor as claimed in claim 1, further comprises a power cord inserted through said cover and electrically connected to said left-side electric brush and said right-side electric brush for receiving external AC power supply.

4. The external rotor brush DC motor as claimed in claim 1, further comprising a fan blade mounted on said front wheel.

* * * * *